E. C. PATTERSON.
Wheel-Cultivator.
No. 45,934
Patented Jan. 17, 1865.
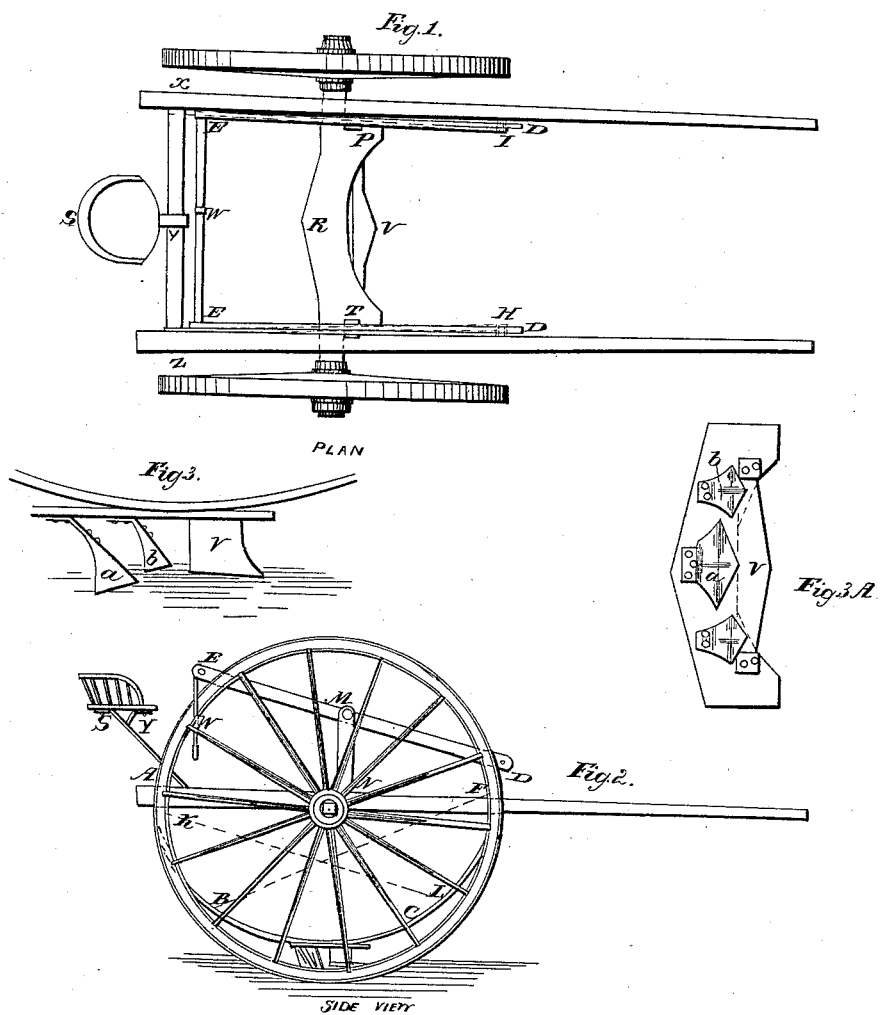

UNITED STATES PATENT OFFICE.

ELIAS C. PATTERSON, OF CHICAGO, ILLINOIS.

IMPROVEMENT IN CULTIVATORS.

Specification forming part of Letters Patent No. 45,934, dated January 17, 1865.

*To all whom it may concern:*

Be it known that I, ELIAS C. PATTERSON, of Chicago, county of Cook, and State of Illinois, have invented certain new and useful Improvements in Cultivators; and I do hereby declare that the following is a full, clear, and exact description thereof, reference being had to the annexed drawings, making part of this specification.

The nature of my invention consists, first, in a new form and arrangement of the plows; and, second, in a novel arrangement of that part of the frame to which the plows are attached, to enable the plowman to raise and depress the plows at will.

To enable others skilled in the art to construct and use my invention, I now proceed to describe its construction and operation.

It belongs to the class of one-horse cultivators, one horse being, as I think, fully efficient for the work to be performed. Two horses, however, or more, may be used, if required. The wheels are of any convenient size, and are far enough apart to straddle two rows of corn at once, making the axle about seven feet in length. The shafts are extended back of the axle, and are there connected by the cross-bar X Z, Figure 1.

If so desired, a second cross-bar may be added a foot or more from the first, and the desired seat may be supported on four legs, two resting on each bar. If only one cross-bar is used, the seat may be supported, as shown in the drawings, on an iron standard, S Y.

Near the back end of the shafts I attach, by means of a bolt or other suitable device, one end of the curved levers A B C D, Fig. 2, one to each shaft, so as to turn freely on said bolts. To the front ends of said levers I attach the two straight levers E D by means of pins or bolts projecting from the ends of the curved levers and working in slots near the ends of the straight levers, as shown at D, Fig. 2; or, instead of pins working in slots, the straight levers may be connected with the curved by means of a short arm or lever attached to each of them by a bolt or hinge joint, or in any other way by which the necessary play may be secured to the curved levers. Where the curved levers cross the shafts in front they may slide up and down in shoulders attached to the shafts, as shown at H and I, Fig. 1. The proper proportions, however, are not given in the drawings, but the shoulders should be represented much longer than they are, otherwise the curved levers would not have sufficient play. The curved levers may be still further supported and strengthened by means of cross-bars running as shown by the dotted lines in Fig. 2 at K L and B F; and, instead of being in the form of an arc of a circle, they may be made in any other suitable arc or in the form of part of a hexagon, or any other form substantially the same. I deem the form given in the drawings, however, much the best in practice. The two straight levers are supported on the upright posts M N, Fig. 2, on which they turn freely up and down, no lateral motion being intended either in these joints or any of those described above. The straight levers are connected at the back by the cross-bar E E, Fig. 1.

The curved levers are connected at the bottom by cross-piece P R T, Fig. 1, and to this cross-piece I attach the plows by screws or bolts, or in any other suitable way, so that they can be taken off or put on at pleasure.

The front plow, V, Fig. 1, is made nearly flat, but curved slightly down toward the ground in front, with a little of the plow shape, so as to enter the ground more readily in the same manner as ordinary plows, but not to the same extent. The form of the edge, which is that of an obtuse angle, is shown plainly in Fig. 1. The object of this plow is not to hill up the corn, but simply to stir the ground and cut up the weeds. It is intended to be used without the three hind plows at the first going over the ground when the corn is yet small. When the corn is big enough to be killed I take off the front plow and put on three hind plows. These stir the ground more thoroughly, and the middle one also throws the earth on each side toward the corn. For this purpose it is made, as shown in the drawings, (though imperfectly,) much broader than ordinary cultivator-plows. It is shown to more advantage in Fig. 3, A, added for that purpose. It covers about one-half the space between the curved levers, the rest of the space being filled, or nearly so, by the two outside plows.

The two outside plows are made in the ordinary form and size. The middle and one outside plow are shown in Fig. 3, but need not be more than half as long. All the plows being attached to the bottom of the curved levers, it will at once be seen that the driver, while seated at S, can at any moment raise them out of and above the ground by pressing down the back end of the straight levers by taking hold of the cross-bar E E, Fig. 1; or, instead of using his hand, he may effect the same thing by pressing with his foot on the stirrup or strap W, or any similar contrivance suspended from the cross-bar; and if he wishes to keep the plows out of the ground, he can do so by slipping the stirrup over a hook or catch attached to the cross-bar X Z. In either case, the united leverage being very long, he can raise the plows with but little effort. If greater power is desired, the uprights M N can be moved farther forward. On withdrawing the pressure the plows will at once fall back of their own weight.

In order to graduate more perfectly the draft of the plows and the depth to which they penetrate, a series of holes may be made in both ends of the curved levers at A and D, Fig. 2, to fit the bolts by which they are attached, so that either end or both may be raised or lowered at will. The diameter of the curved levers I propose to make about four feet; but of course they may be made larger or smaller, as desired.

The advantages of this cultivator are its superior simplicity and economy, both in point of construction and operation, the convenient manner of throwing the plows out of the ground, and the peculiar form and arrangement of the plows, by which the ground can be better and more easily cultivated than by the cultivators now generally in use.

I do not claim the lifting of the plows out of the ground in general, as that is already known; but

What I claim as my invention, and desire to secure by Letters Patent, is—

1. The curved levers A B C D, constructed and operating substantially as described.

2. The combination of the curved and straight levers, constructed and operating substantially as described.

3. The combination of the curved and straight levers with the plows, constructed and operating substantially as described.

4. The peculiar form and arrangement of the middle rear plows, in connection and combination with the two outside rear plows, all constructed and operating substantially as described.

ELIAS C. PATTERSON.

Witnesses:
 GEORGE PAYSON,
 W. J. HAMILTON.